(12) United States Patent
Sims

(10) Patent No.: US 11,931,638 B2
(45) Date of Patent: Mar. 19, 2024

(54) BABY WEIGHT STROLLER

(71) Applicant: Lynwood Sims, Rock Hills, SC (US)

(72) Inventor: Lynwood Sims, Rock Hills, SC (US)

(73) Assignee: Lynwood Sims, Rock, SC (US)

( * ) Notice: Subject to any disclaimer, the term of this patent is extended or adjusted under 35 U.S.C. 154(b) by 106 days.

(21) Appl. No.: 17/242,070

(22) Filed: Apr. 27, 2021

(65) Prior Publication Data

US 2022/0339517 A1    Oct. 27, 2022

(51) Int. Cl.
| | | |
|---|---|---|
| *A63B 71/00* | (2006.01) | |
| *A63B 21/06* | (2006.01) | |
| *A63B 21/072* | (2006.01) | |
| *A63B 21/078* | (2006.01) | |
| *B62B 7/04* | (2006.01) | |
| *B62B 9/00* | (2006.01) | |

(52) U.S. Cl.
CPC ...... *A63B 71/0036* (2013.01); *A63B 21/0615* (2013.01); *A63B 21/0618* (2013.01); *A63B 21/0724* (2013.01); *A63B 21/0728* (2013.01); *A63B 21/078* (2013.01); *B62B 7/04* (2013.01); *B62B 9/00* (2013.01)

(58) Field of Classification Search
CPC ..... B62B 7/03; B62B 9/00; A63B 2071/0018; A63B 71/0036; A63B 21/0004; A63B 21/06; A63B 21/0615; A63B 21/0618; A63B 21/072; A63B 21/0724; A63B 21/0726; A63B 21/0728; A63B 21/075; A63B 21/16; A63B 21/1609; A47C 9/002
See application file for complete search history.

(56) References Cited

U.S. PATENT DOCUMENTS

| | | | | |
|---|---|---|---|---|
| 4,153,244 A | * | 5/1979 | Tauber, Jr. | A63B 17/00 482/904 |
| 4,477,074 A | * | 10/1984 | Bushnell | A63B 21/078 482/106 |
| 5,810,697 A | * | 9/1998 | Joiner | A63B 23/047 482/68 |
| 7,275,554 B2 | * | 10/2007 | Mullholand | A61H 3/008 135/67 |
| 7,309,071 B1 | | 12/2007 | Michael | |
| 8,469,861 B1 | | 6/2013 | McFee | |
| 9,808,663 B2 | * | 11/2017 | Chen | A63B 23/03591 |
| 10,722,746 B2 | | 7/2020 | Towley | |
| 10,857,059 B1 | * | 12/2020 | Irsay | A61H 3/04 |

(Continued)

FOREIGN PATENT DOCUMENTS

| | | | | |
|---|---|---|---|---|
| SE | 460261 | | 3/1986 | |
| WO | WO-2015079468 A1 | * | 6/2015 | A61G 5/10 |

*Primary Examiner* — Nyca T Nguyen
*Assistant Examiner* — Zachary T Moore

(57) ABSTRACT

An article of manufacture providing an exercise device for work-out with a stroller according to the present invention includes the stroller having a frame having a front portion and a rear portion, a front wheel assembly coupled to the front portion of the frame, a pair of rear wheels coupled to the rear portion of the frame and a handle coupled to the rear portion of the frame above the pair of rear wheels and a plurality of barbells coupled across the stroller for supporting removable weights on both ends of the barbells. A first barbell coupled across the rear portion of the frame between the pair of rear wheels and the handle. A second barbell coupled across front wheel assembly. A third barbell coupled across the handle.

9 Claims, 7 Drawing Sheets

(56) References Cited

U.S. PATENT DOCUMENTS

| | | | |
|---|---|---|---|
| 2008/0146422 A1* | 6/2008 | Bae | A47C 9/002 |
| | | | 482/130 |
| 2017/0216657 A1* | 8/2017 | Hoobler | A63B 23/1209 |
| 2018/0243597 A1* | 8/2018 | Schlegel | A63B 69/34 |
| 2018/0339181 A1* | 11/2018 | Weisz | A63B 22/0605 |
| 2019/0111301 A1 | 4/2019 | Asanovich | |
| 2022/0047442 A1* | 2/2022 | Taylor | A47C 9/002 |

* cited by examiner

BABY WEIGHT STROLLER

TECHNICAL FIELD

This application relates in general to an article of manufacture for an exercise baby stroller that provides a work-out with the stroller.

BACKGROUND

Parents with small children typically are so busy with taking care of the children that they may find it difficult to find time to exercise, whether at home or at a gym. When the children are quite young, they need to be carried everywhere. While carrying a child may provide a form of exercise, it does not permit the parent to obtain the effects of a complete and multi-exercise workout. These parents may use a stroller when taking the children to and from various places, when walking about a store or shopping mall, and when walking about a neighborhood or park. These are the times when the parents may be able to add a little exercise to their day if they had appropriate equipment to perform different exercises.

The present invention attempts to address these existing limitations in baby strollers for providing exercise according to the principles and example embodiments disclosed herein.

SUMMARY

In accordance with the present invention, the above and other problems are solved by providing an article of manufacture for an exercise baby stroller that provides a work-out with the stroller.

The great utility of the invention is that it's an article of manufacture for an exercise baby stroller that provides a work-out with the stroller and a plurality of barbells. The stroller having a frame having a front portion and a rear portion, a front wheel assembly coupled to the front portion of the frame, a pair of rear wheels coupled to the rear portion of the frame and a handle coupled to the rear portion of the frame above the pair of rear wheels and a plurality of barbells coupled across the stroller for supporting removable weights on both ends of the barbells.

In another aspect of the disclosure, a first barbell coupled across the rear portion of the frame between the pair of rear wheels and the handle.

In another aspect of the disclosure, a second barbell coupled across front wheel assembly.

In another aspect of the disclosure, a third barbell coupled across the handle.

In another aspect of the disclosure, each of the plurality of barbells comprises one or more equally sized weights coupled to each end of the barbell restrained by a mounting collar.

In another aspect of the disclosure, the one or more equally sized weights comprise solid metal disks.

In another aspect of the disclosure, the one or more equally sized weights comprise sand-filled hollow disks.

In another aspect of the disclosure, the first barbell holds the heaviest pair of weights.

In another aspect of the disclosure, the third barbell holds the lightest pair of weights.

In another aspect of the disclosure, the plurality of barbells are coupled to the stroller by bolts through the barbells and frame secured by a nut.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
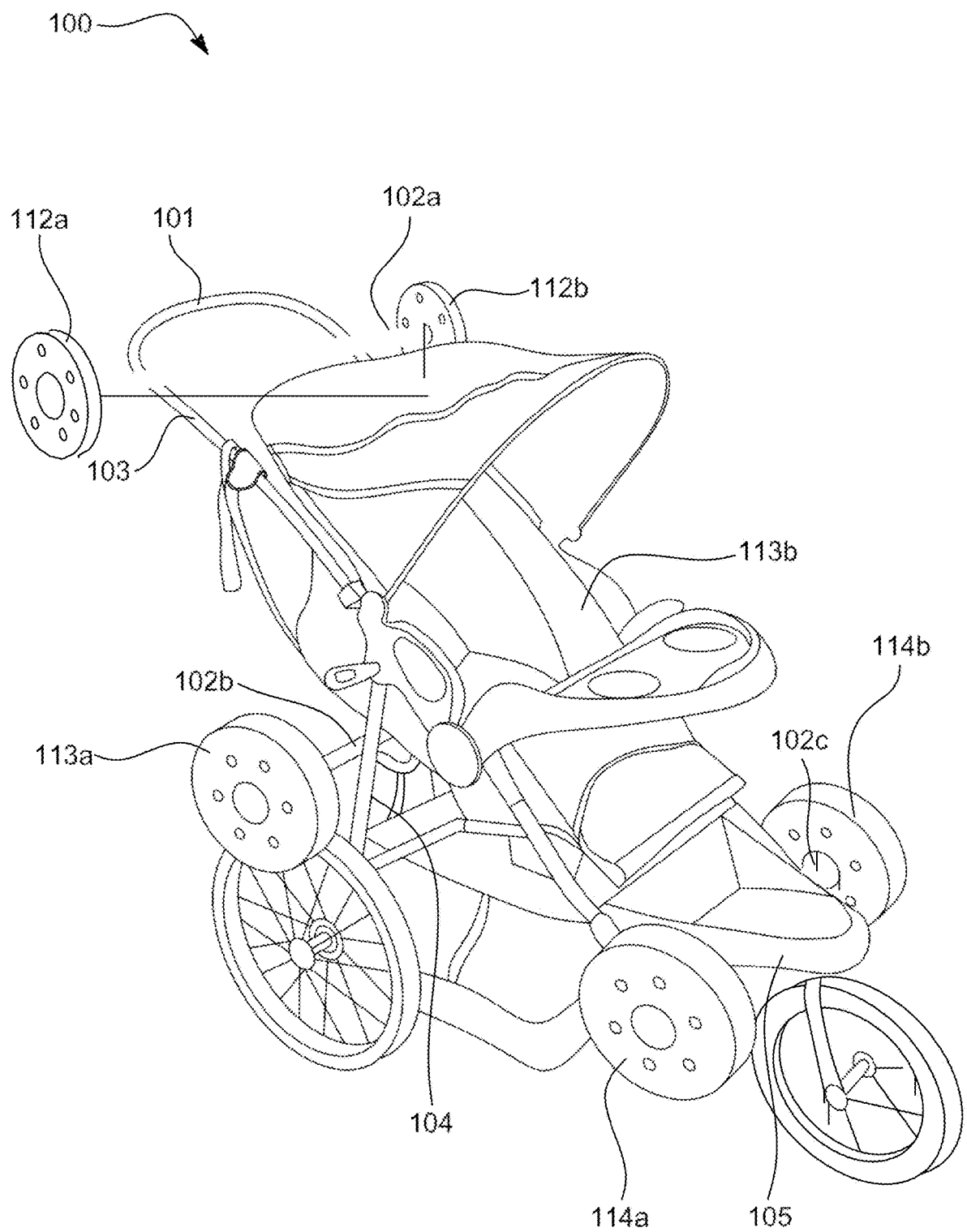
FIG. 1 illustrates a first view of an example embodiment of an article of manufacture for an exercise baby stroller that provides a work-out with the stroller according to the present invention.

This application relates in general to an article of manufacture for providing an exercise work-out with a stroller according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps, or components but do not preclude the presence or addition of one or more other features, steps, or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill. Further, unless otherwise stated, the term "about" shall expressly include "exactly."

The term "user" and "parent" refer to an entity, e.g. a human, that utilizes a device according to the present invention in order to bring about a desired effect or outcome, particularly provide the user an ability to exercise with the stroller. In a particular case, the user is one that uses a weighted baby stroller disclosed herein. For such a user, the terms "user" and "parent" may be used herein interchangeably.

The term "invention" or "present invention" refers to the invention being applied for via the patent application with the title "Baby Weight Stroller." Invention may be used interchangeably with stroller.

In general, the present disclosure relates to an article of manufacture for providing an exercise work-out with a stroller according to the present invention. To better understand the present invention, FIG. 1 illustrates a first view of an example embodiment of an article of manufacture for an exercise baby stroller that provides a work-out with the stroller according to the present invention. A baby weight stroller 100 is shown having sets of weights attached to permit a parent to perform forms of exercise while pushing a child in the stroller 101.

Figure 2:
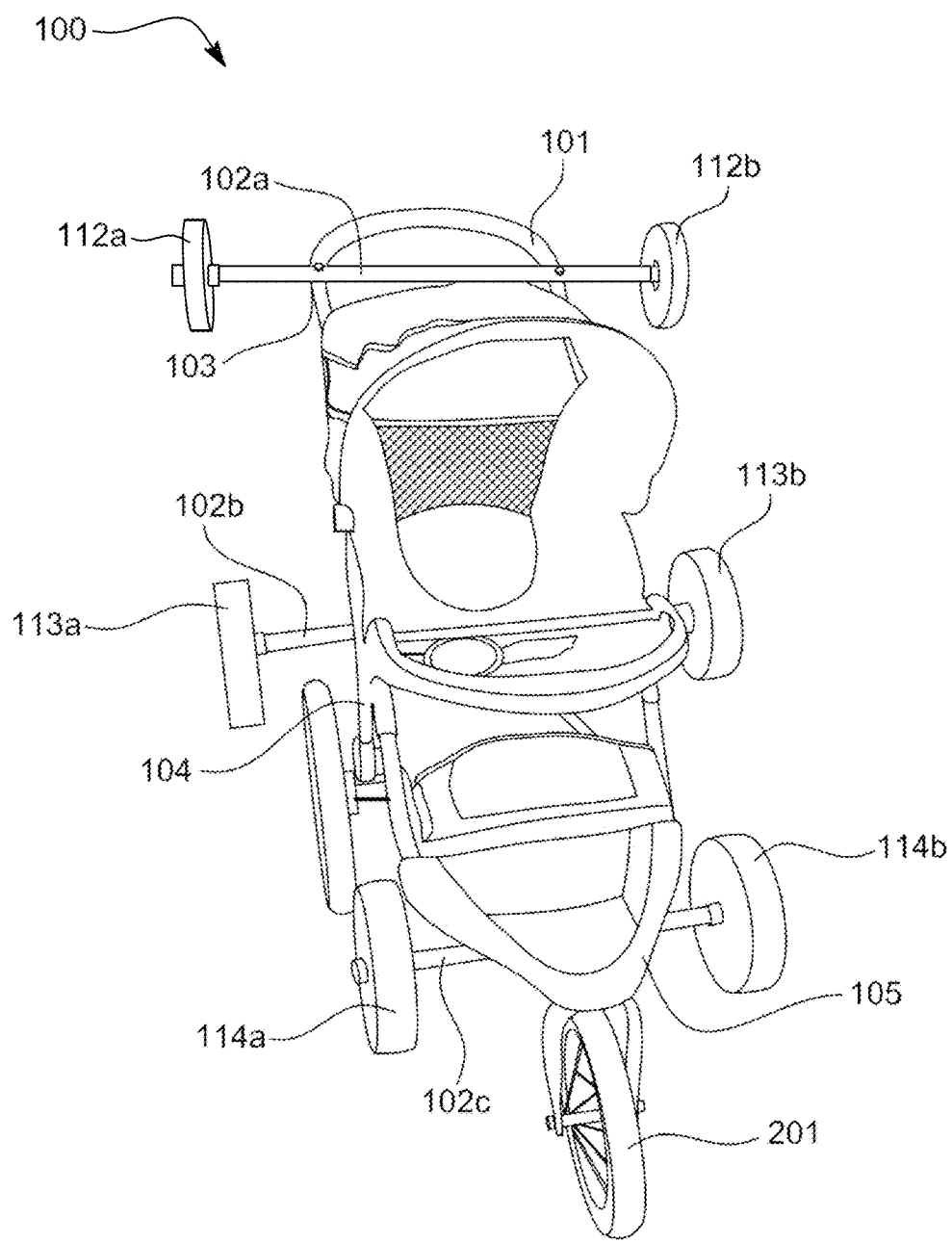
FIG. 2 illustrates a second view of an example embodiment of an article of manufacture for an exercise baby stroller that provides a work-out with the stroller according to the present invention.
Figure 3:
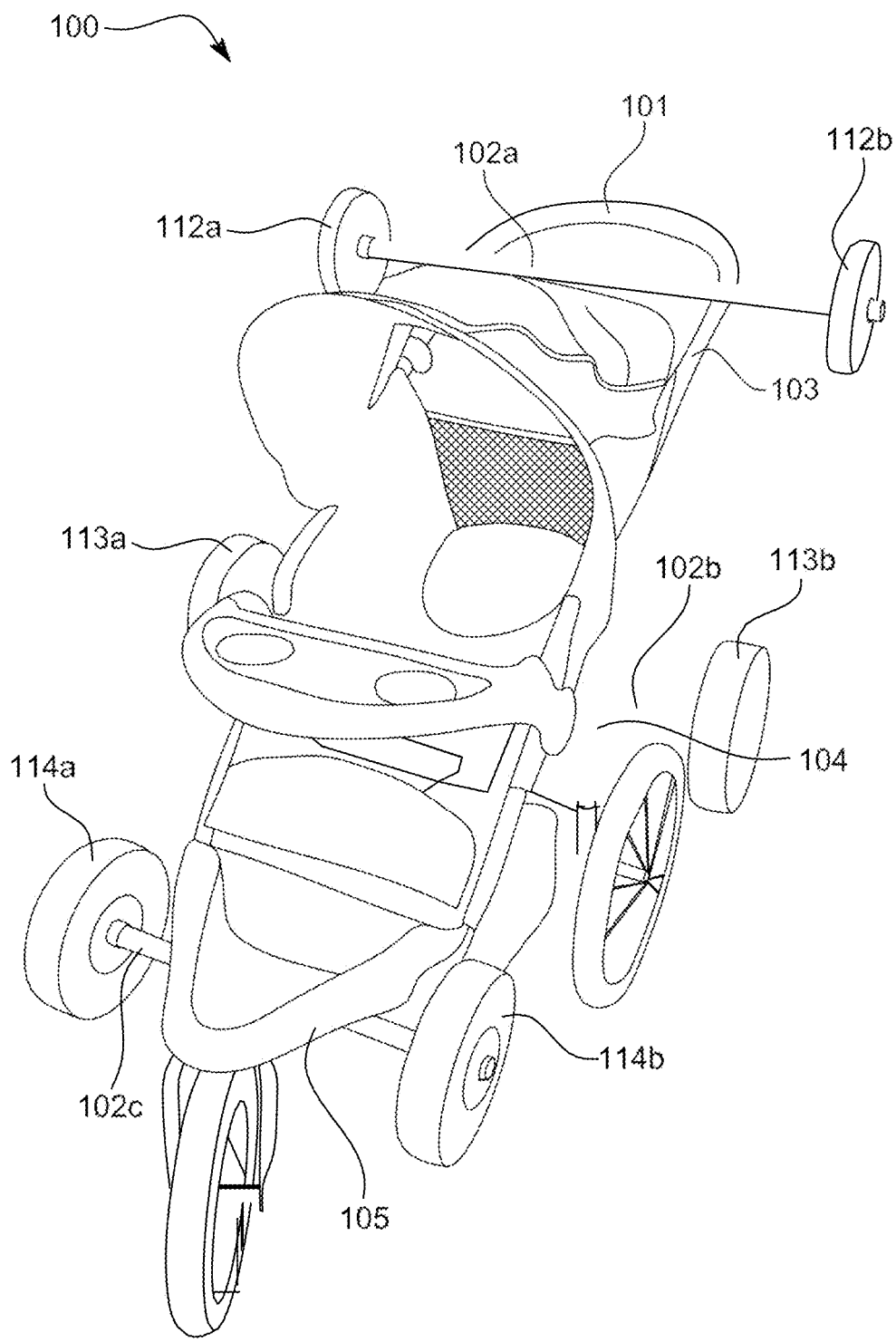
FIG. 3 illustrates a third view of an example embodiment of an article of manufacture for an exercise baby stroller that provides a work-out with the stroller according to the present invention.

The stroller 101 typically has a handle 103, a center frame 104, and a front wheel support 105 that are coupled together while using a plurality of wheels to permit the stroller 101 to move. The stroller 101 shown in FIGS. 1-3 is an example of one possible embodiment in which the present invention may utilize strollers having different designs and configurations.

Typically, the handle 103 extends from the rear of the stroller 101 from a point that positions the handle 103 at a waist-high position to permit easy pushing of the stroller 101. The stroller 101 possesses a main frame 104 that typically connects a front set of wheels to a rear set of wheels that creates a platform between the wheels in which a child may be positioned. A seat, carrier, or similar child restraining device typically rests within this platform between the front and rear sets of wheels.

The front set of wheels also are coupled to a support 105 that is coupled to the main frame 104. The front wheel support 105 may be integrated into the main frame 104 about the front end of the stroller 101. Typically, the front wheels provide a flat segment connecting the front wheels at ground level to the platform on to which the child seat or carrier is attached to the main frame 104.

A first barbell 102a may be coupled to the handle 103 in which the barbell 102a is attached to the handle 103 on each side of the stroller 101. A second barbell 102b may be coupled to the main frame 104 typically along a back surface of the stroller 101 above the rear wheels. The second barbell 102b may be coupled to vertical supports on both sides of the main frame 104 in an example embodiment of FIG. 1. A third barbell 102c may be coupled across the front wheel support 105 in which the third barbell 102c is coupled to supports on both sides of the stroller 101 at a location above and slightly behind the front wheels. Other locations on the stroller 101, depending upon its configuration, may be used to couple a barbell either in addition to, or in place of, the barbells 102a-c of FIG. 1.

A pair of matching weights may be attached to each end of the three barbells 102a-c. A first pair of weights 112a-b is located on the opposite ends of the first barbell 102a. A second pair of weights 113a-b is located on the opposite ends of the first barbell 102b. A third pair of weights 114a-b is located on the opposite ends of the first barbell 102c. These pairs of weights may be the same amount of weight in one embodiment and may be different values of weights for each pair in an alternate embodiment. The pairs of weights may be chosen to add a desired amount of additional weight to be pushed when the parent uses the stroller 101. Each of the pairs of weights may be added, removed, or changed for different users of the stroller 101.

FIG. 2 illustrates a second view of an example embodiment of an article of manufacture for an exercise baby stroller that provides a work-out with the stroller according to the present invention. In this front view of the stroller 101, the first barbell 102a can be seen balanced across the handle 103 of the stroller 101. The first barbell 102a is centered between the supporting parts of the handle 103 containing equal amounts of weights 112a-b on each side. On the front of the stroller 101 behind the front wheel 201, the third barbell 102c can be seen balanced and centered between the supporting parts of the front wheel 201. The second barbell 102a contains equal amounts of weights 114a-b on each side.

FIG. 3 illustrates a third view of an example embodiment of an article of manufacture for an exercise baby stroller that provides a work-out with the stroller according to the present invention. In this diagonal front view of the stroller 101, the second barbell 102b can be seen balanced across vertical supports on both sides of the main frame 104 above the rear wheels 202 of the stroller 101. The second barbell 102b is centered between the supporting parts of the frame 104 below the handle 103 containing equal amounts of weights 112a-b on each side. With these weights in place, the present invention 100 may be used to perform a number of different exercises as may be shown in FIGS. 4-5. A child is typically not present in the stroller 101 when it is being used to perform exercises. although a child may be present if the present invention 101 is used to provide a weighted resistance to a user while walking and running.

Figure 4A:
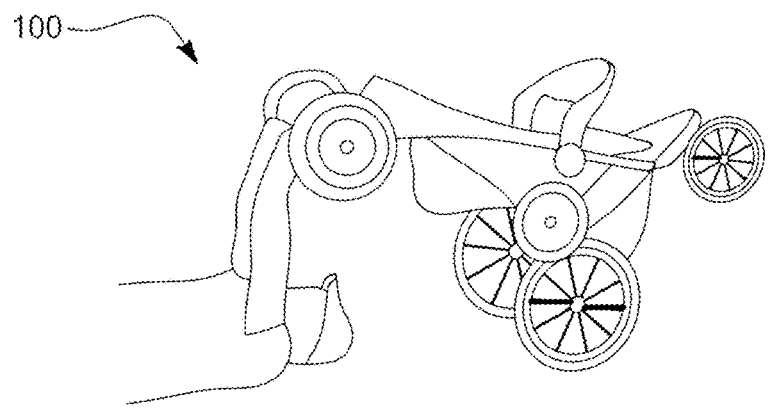
FIG. 4a-c illustrate a set of exercises performed using an article of manufacture for an exercise baby stroller that provides a work-out.
Figure 4B:
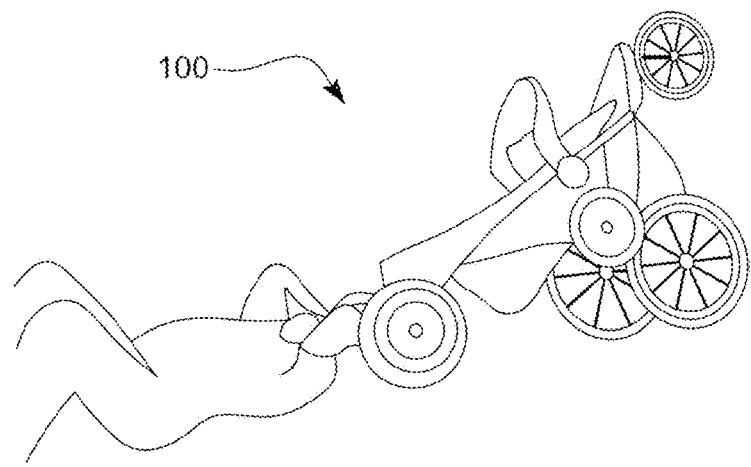
Figure 4C:
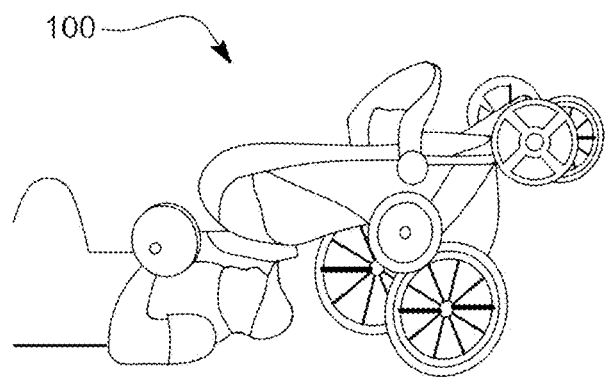
Figure 5A:
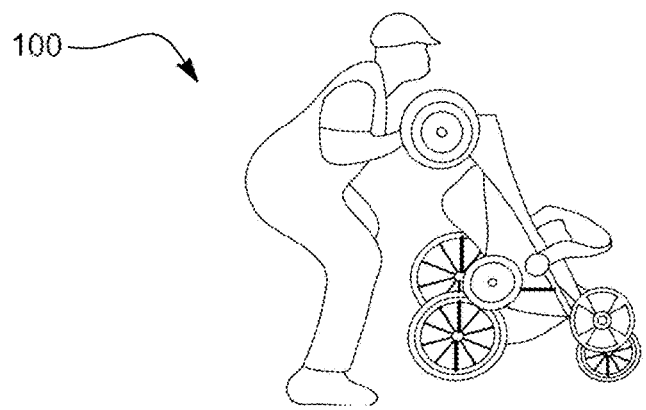
FIG. 5a-h illustrate another set of exercises performed using an article of manufacture for an exercise baby stroller that provides a work-out.
Figure 5B:
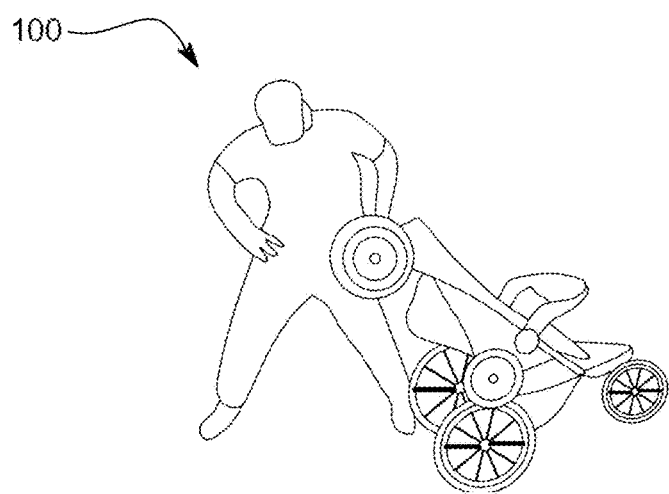
Figure 5C:
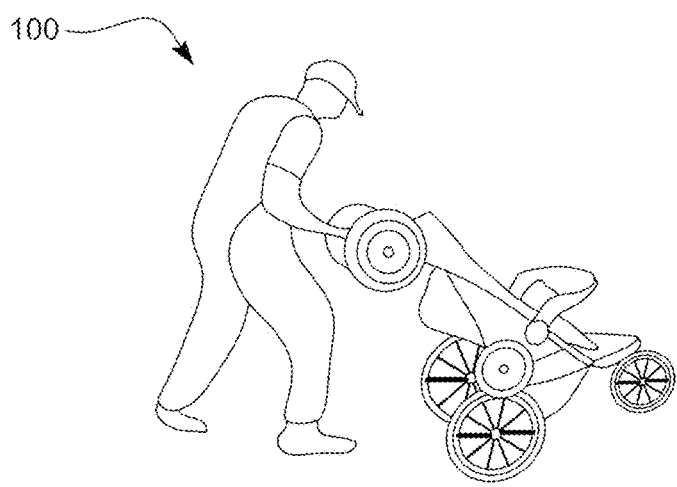
Figure 5D:
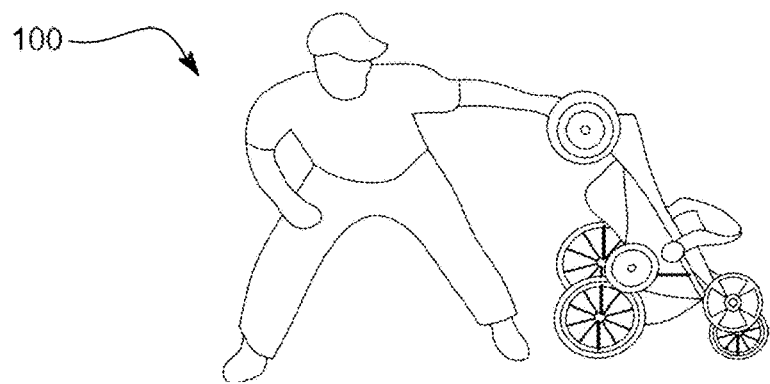
Figure 5E:
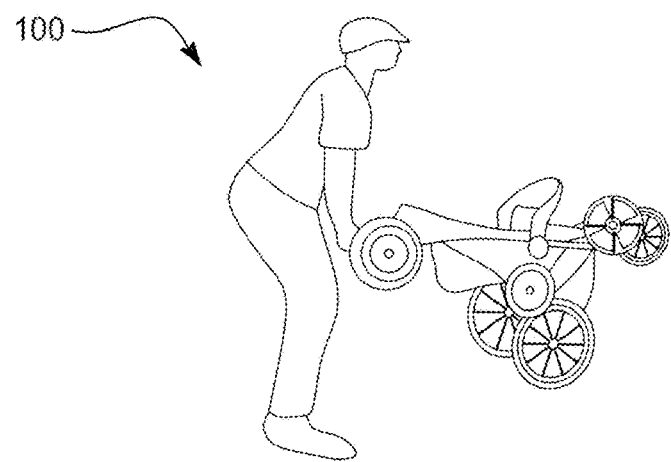
Figure 5F:
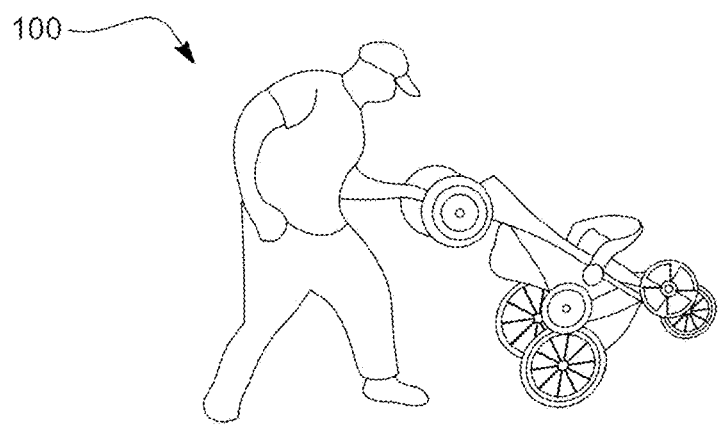
Figure 5G:
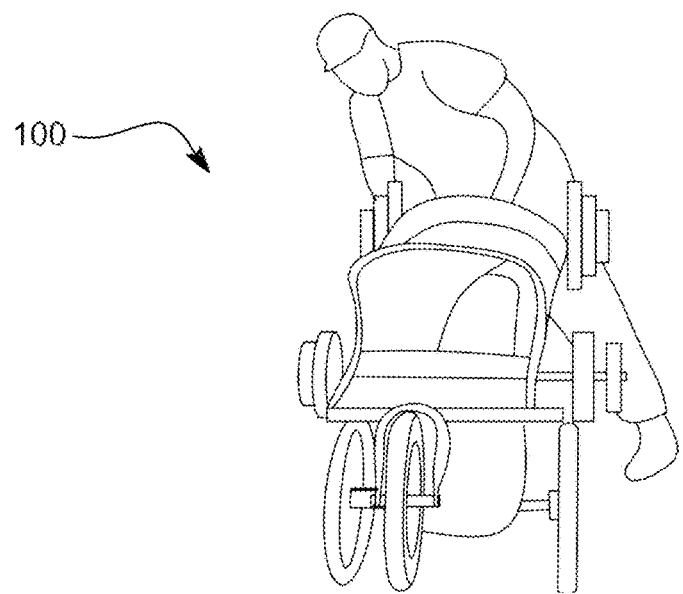
Figure 5H:
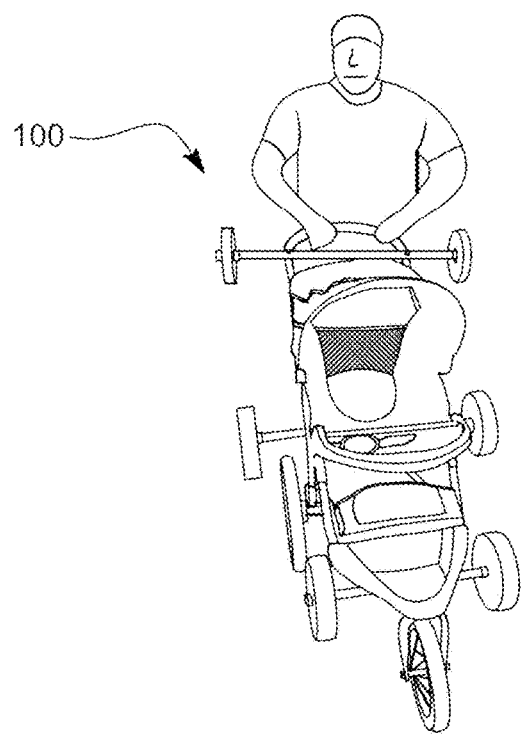

FIG. 4a-c illustrate a set of exercises performed using an article of manufacture for an exercise baby stroller that provides a work-out. A first set of exercises are shown in FIGS. 4a-c while the user is laying on his or her back. The stroller 101 pivots about an axle between the rear wheels 202 as the user raises and lowers the handle 103. The added weights are lifted as part of these movements as shown in FIGS. 4*a-c*.

FIG. 5*a-h* illustrate another set of exercises performed using an article of manufacture for an exercise baby stroller that provides a work-out. A second set of exercises are shown in FIGS. 5*a-h* while the user is standing or squatting on his or her feet. The stroller 101 again pivots about an axle between the rear wheels 202 as the user raises and lowers the handle 103. The added weights are lifted as part of these movements as shown in FIGS. 5*a-h*.

The second set of exercises may be performed using one or both arms and the lifting may be performed using the user's arms, the user's legs, the user's torso, and combinations of the above. The user may perform as many repetitions as possible, in sets and in a single session. The user may add or remove weight from one or more of the barbells 102*a-c* as desired. Equal amount of weight is added or removed from each barbell 102*a-c* to keep each barbell balanced to maintain balance of the stroller when is use. The weights on each barbell 102*a-c* are retrained on the ends of barbells using retention devices or collars which may be removed to slide additional weights and/or different sizes weights onto and off of the barbells 102*a-c* before the retention device is reinstalled before using the stroller 101 to exercise.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

What is claimed is:

1. An exercise device comprising:
   a stroller comprising:
     a frame having a front portion and a rear portion;
     a front wheel assembly coupled to the front portion of the frame;
     a pair of rear wheels coupled to the rear portion of the frame; and
     a handle coupled to the rear portion of the frame above the pair of rear wheels; and
   a plurality of barbells coupled across the stroller for supporting removable weights on both ends of the barbells;
   wherein the plurality of barbells comprises a first barbell coupled across the rear portion of the frame between the pair of rear wheels and the handle.

2. The exercise device according to claim 1, wherein the plurality of barbells further comprises a second barbell coupled across front wheel assembly.

3. The exercise device according to claim 2, wherein the plurality of barbells further comprises a third barbell coupled across the handle.

4. The exercise device according to claim 3, wherein the first barbell holds a heaviest pair of weights.

5. The exercise device according to claim 4, wherein the third barbell holds a lightest pair of weights.

6. The exercise device according to claim 4, wherein the plurality of barbells are coupled to the stroller by bolts through the barbells and the frame secured by a nut.

7. The exercise device according to claim 1, wherein each barbell of the plurality of barbells comprises one or more equally sized weights coupled to each end of the barbell restrained by a mounting collar.

8. The exercise device according to claim 7, wherein the one or more equally sized weights comprise solid metal disks.

9. The exercise device according to claim 7, wherein the one or more equally sized weights comprise sand-filled hollow disks.

* * * * *